W. D. LABADIE.
CORN POPPER.
APPLICATION FILED JUNE 20, 1921.
1,430,511.  Patented Sept. 26, 1922.
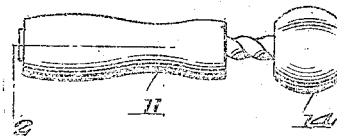
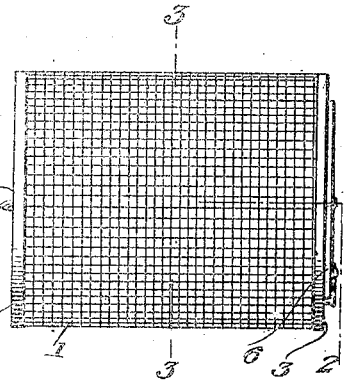
Fig. 1.
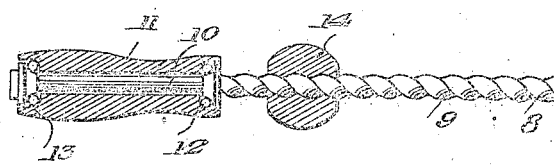
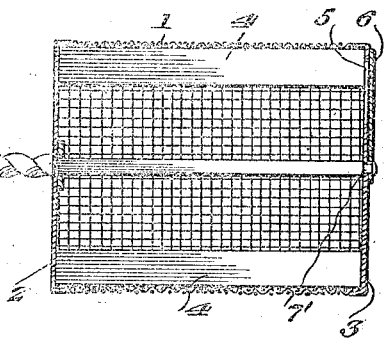
Fig. 2.
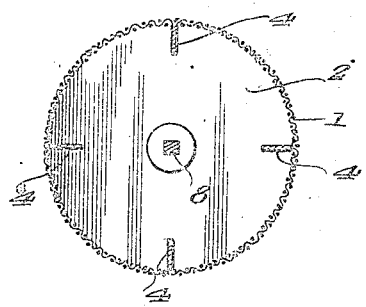
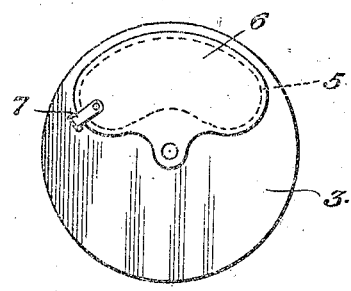
Fig. 3.  Fig. 4.
William D. Labadie
INVENTOR
BY Victor J. Evans
ATTORNEY
C. Nye Fraser Jr.
WITNESS:

Patented Sept. 26, 1922.

1,430,511

UNITED STATES PATENT OFFICE.

WILLIAM DARVIN LABADIE, OF CHICAGO, ILLINOIS, ASSIGNOR TO WALTER BANDURSKI, OF CHICAGO, ILLINOIS.

CORN POPPER.

Application filed June 20, 1921. Serial No. 479,075.

*To all whom it may concern:*

Be it known that I, WILLIAM D. LABADIE, a citizen of the United States, residing at Chicago, in the county of Cook and State of Illinois, have invented new and useful Improvements in Corn Poppers, of which the following is a specification.

My present invention has reference to an improved corn popper.

My object is to produce a device of this character in which a cage, in which the corn to be popped is received and held over the fire, can be reversely rotated in an easy and expeditious manner, without subjecting the operator to danger from the flame or from the heated cage.

A further object is to produce a corn popper in which the cage thereof is provided with a spiral shank that finds a bearing in a handle at the end thereof, while on the shank there is a runner in the nature of a nut whose threads engage the grooves in the spiral shank, said handle being grasped by one hand of the operator, the runner by the other, and said runner being reciprocated longitudinally on the shank to cause the cage to turn rapidly in opposite directions, so that the corn therein can be popped in an easy manner without subjecting the operator to danger of injury from the flame or from the heated cage.

The foregoing, and other objects which will appear as the nature of the invention is better understood, may be accomplished by a construction, combination and operative association of parts, such as is disclosed by the drawings which accompany and which form part of this specification.

In the drawings:—

Figure 1 is an elevation of a corn popper in accordance with this invention.

Figure 2 is a sectional view on the line 2—2 of Figure 1, on an enlarged scale.

Figure 3 is a sectional view on the line 3—3 of Figure 1.

Figure 4 is a view looking toward the end of the cage.

The cage of my improved corn poper is in the nature of a reticulated cylinder, and is indicated, in the drawings, by the numeral 1. The ends of the cylinder may be and preferably are constructed of metal disks, and are indicated by the numerals 2 and 3 respectively. Between the disks there are arranged spaced plates 4 which are in contacting engagement with the inner face of the reticulated body and materially reinforce the said body. The outer end disk 3 is provided with an opening 5 whereby the corn to be popped may be inserted in the cage, and the popped corn delivered therefrom. The opening 5, however, is normally closed by a door 6, suitable latching means 7, being provided for holding the door closed. The door 6 is in the nature of a plate, and is preferably pivotally supported on the reduced cross sectionally rounded non-threaded end 7 of the shank 8 to slide laterally over the opening. The body of the shank is grooved spirally, as at 9, the said body being round in cross section, and the outer end of the shank is provided with a reduced cross sectionally rounded extension 10. The extension 10 is received in the bore of the handle 11, and anti-frictional elements 12 and 13 respectively are arranged between the ends of the handle and the shank.

On the spiral shank 9 there is a runner which is in the nature of a nut 14, the outer surface of the runner being preferably rounded or of an elliptical shape.

In use, the operator holds the handle 11 of the device with one hand, while the other engages the runner 14. The runner is reciprocated longitudinally over the spiral shank 9, causing the same to revolve in two directions, and imparting a like motion to the cage 1.

The shank is reduced square in cross section at the cage end to accommodate the squared apertured disk so the cage will be given as many revolutions as is imparted to the shaft and this cross sectionally squared reduction is arranged through said cage and further reduced round in cross section for adaption to the door 6 as above described.

It is thought that the foregoing description, when taken in connection with the drawings will amply set forth the construction, operation and advantages of the improvement, and therefore, further detail description will not be attempted.

Having described the invention, I claim:—

A corn popper of the character described comprising a reticulated cylindrical cage, a metallic disk designed to close one end of the cage and being provided with an opening adjacent its edge thereof and there being a rounded aperture arranged in its center, a second disk designed to close the opposite end of the cage and being provided with a square aperture arranged in its center, a plurality of spaced plates arranged between said disks and in contacting engagement with the inner face of said cylindrical cage, a shank adapted to support the cage and being reduced square in cross section to engage the square aperture of the disk, said shank extending through the cage and being reduced round in cross section to accommodate itself to the round aperture of the second mentioned disk, a door pivotally secured to the rounded reduction and adapted to slide laterally over said opening and means for rotating said shank.

In testimony whereof I affix my signature.

WILLIAM DARVIN LABADIE.